United States Patent [19]

Shepard

[11] Patent Number: 4,970,597

[45] Date of Patent: Nov. 13, 1990

[54] METHOD TO IMAGE HIGH SPEED EVENTS USING A STANDARD VIDEO CAMERA

[75] Inventor: Steven M. Shepard, Oakland County, Mich.

[73] Assignee: The United States of America as represented by the Secretary of the Army, Washington, D.C.

[21] Appl. No.: 468,336

[22] Filed: Jan. 22, 1990

[51] Int. Cl.⁵ .................... H04N 7/18; H04N 5/30
[52] U.S. Cl. .................................. 358/209; 358/93; 358/113; 358/108; 358/208
[58] Field of Search ............... 358/93, 209, 108, 105, 358/206, 225, 227, 228, 100, 208, 903, 213.13, 113, 216

[56] References Cited

U.S. PATENT DOCUMENTS

| | | | |
|---|---|---|---|
| 4,453,182 | 6/1984 | Wilkinson et al. | 358/108 |
| 4,551,764 | 11/1985 | Ogawa | 358/228 |
| 4,628,352 | 12/1986 | Boue | 358/93 |
| 4,695,887 | 9/1987 | Peterson | 358/213.13 |
| 4,713,686 | 12/1987 | Ozaki et al. | 358/93 X |
| 4,713,687 | 12/1987 | Shimizu et al. | 358/93 |

Primary Examiner—Victor R. Kostak
Attorney, Agent, or Firm—Peter A. Taucher; David L. Kuhn

[57] ABSTRACT

The invention is a method of imaging a high speed event. A multiplicity of frames, or image fields, are output from a camera which scans repeated occurrences of the event. Selected data representing individual portions of frames are accumulated in essentially random order. The selected data are used to construct a composite image of the high speed event.

10 Claims, 5 Drawing Sheets

METHOD TO IMAGE HIGH SPEED EVENTS USING A STANDARD VIDEO CAMERA

GOVERNMENT INTEREST

The invention described herein may be manufactured, used, and licensed by or for the Government for governmental purposes without payment to me of any royalty thereon.

BACKGROUND OF THE INVENTION

The present invention relates to the construction of images of high speed events by imaging systems which can send video output directly to electronic data processors. Present imaging systems of this kind typically have a 3 HZ frame rate and the speed of the phenomena which these systems can record is limited since events occurring faster than the frame rate are aliased, or distorted. It is, of course, possible to build specialized equipment to image high speed events, but this equipment is expensive, costing hundreds of thousands of dollars. Further, the specialized equipment is not compatible with standard, off-the-shelf image processing equipment.

SUMMARY OF THE INVENTION

My invention comprises a method using relatively inexpensive equipment to produce an image of a recurring high speed event using a standard video camera. The camera executes raster patterns wherein the camera repeatedly and sequentially scans a series of parallel lines which comprise an image field, and then the camera generates a video signal comprised of line signals representing the parallel lines. The scan time for a single line is relatively rapid, typically 62.5 microseconds. In my method, the camera continuously views the recurring event and, independently, a flagging signal is generated each time the event occurs such that the time interval between the event and the flagging signal is constant.

For each complete image field, one or more of the recurring events will begin during an aperture signal that occurs once per line signal. The aperture signal has a constant duration time, and begins at a constant time interval from the onset of the line signal. When a recurrence of the event begins during an aperture signal, the line then being scanned will accurately represent a portion of the event. Signals or data representing these accurate or synchronized lines are collected and stored in a computer memory. The synchronized lines are not collected in any particular order, but are gathered randomly, as they occur. After a period of time, there will be a distribution of randomly collected synchronized lines such that a complete image can be formed. Each parallel line of the image field will have been collected at least once and some of the parallel lines will have been collected more than once. After a further period of time, numerous complete images can be constructed from the collected synchronized lines. The numerous signals for each synchronized line are subjected to a signal averaging process to eliminate noise and the averaged synchronized lines are then formed into a composite image representing the high speed event.

DETAILED DESCRIPTION

Figure 1:
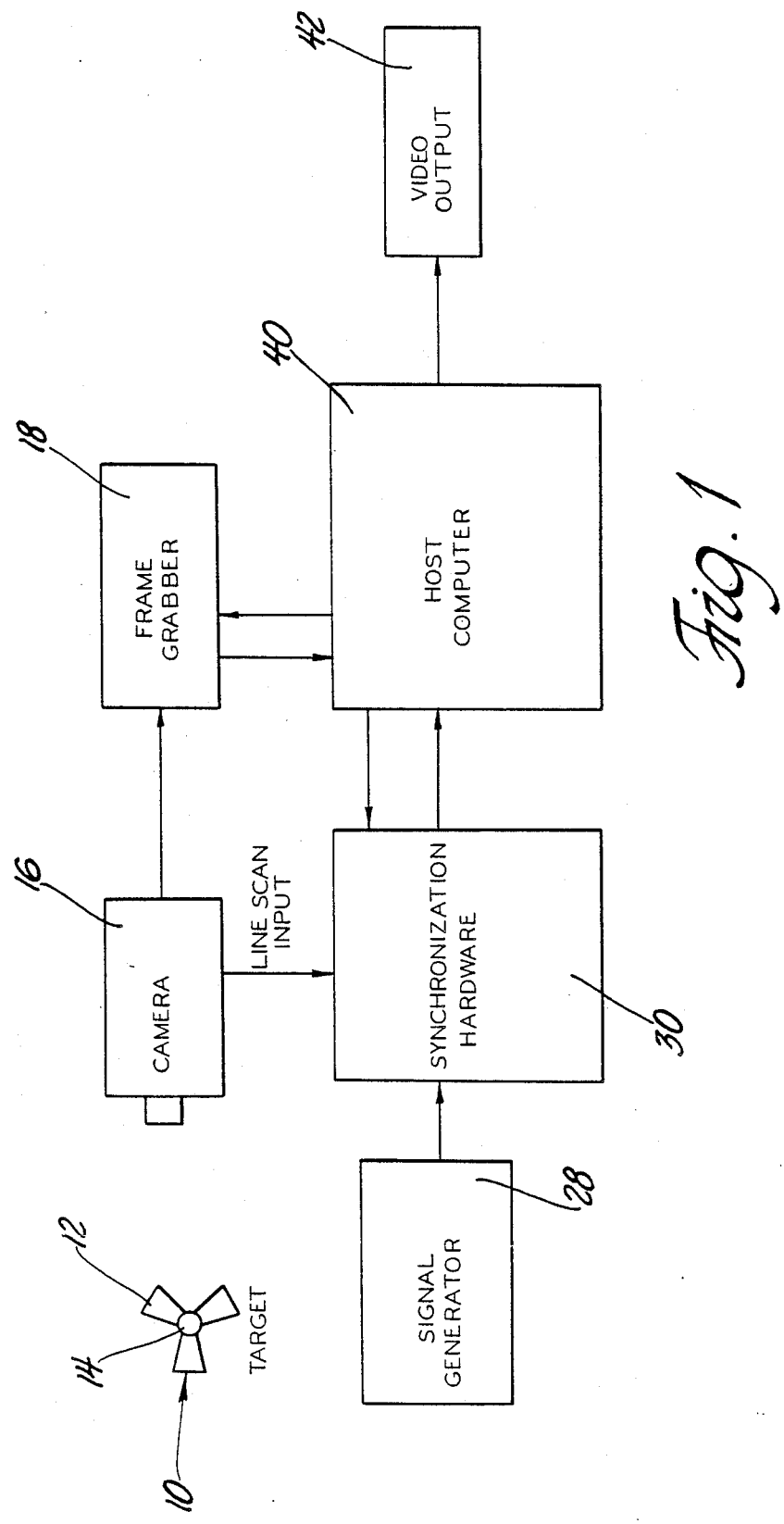
FIG. 1 is a schematic representation of the various items of hardware in my imaging apparatus.

In FIG. 1, there is shown a target 10 where a rapidly repeating event occurs. The event can be the rotation of a fan blade 12 on shaft 14 as shown in FIG. 1. The event can also be, for example, the reciprocation of a piston in a combustion chamber, or it could be the repeated motion of an element of a mechanical linkage. A video camera 16 continuously scans the target as the target moves and sends video signals representing the camera's raster patterns, or frames, to frame grabber 18. Camera 16 is typically an infra-red camera and preferably has a standard RS-170 output so that it can interface with relatively inexpensive off-the-shelf video processing equipment. For economy, camera 16 itself is also preferably an off-the-shelf item. The particular camera used for my method included sinusoidally driven, vertically and horizontally oscillated mirrors. The mirrors cooperate to scan an object plane and produce a raster pattern on the camera's image plane. The video signal of camera 16 is shown at 20 in FIG. 2, wherein a blanking signal 22 in the form of a stepped notch occurs between each frame. The frame itself is comprised of a multiplicity of signals 26 separated by horizontal blanking pulses 24 having the shape of notched signal elements. The signals 26 each represent an individual horizontal line in the raster pattern of camera 16.

Figure 2:
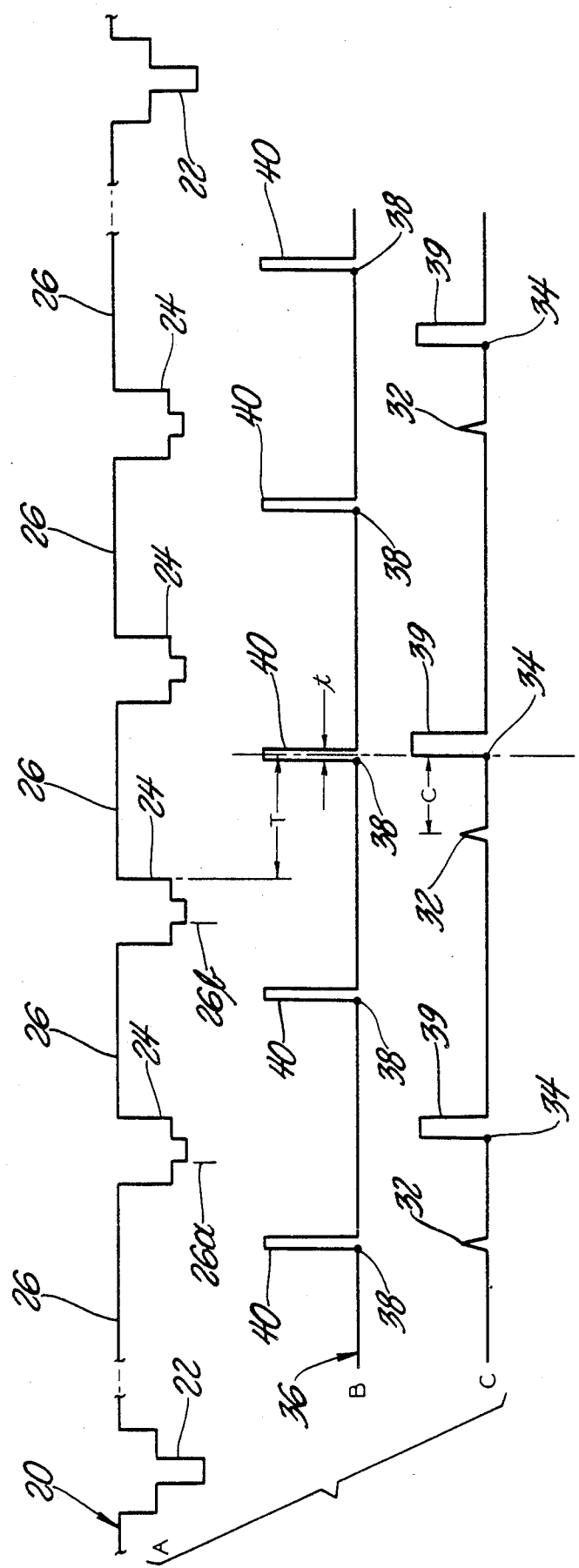
FIG. 2 is a graphic representation of a video signal, an aperture signal synchronized to the line signals of the camera video signal, and a recurring event to be imaged.

Associated with and responding to target 10 is signal generator 28, which outputs an flagging signal at a known time interval before the event to be imaged occurs. In a case where a moving fan blade was the target to be imaged, the signal generator included a light source sending a light beam across the path of the fan blade to a light sensitive receptor. The receptor sent the flagging signal each time the targeted blade interrupted the light beam, the receptor signal occurring a fixed amount of time before the targeted blade reached the position where it was viewed by the camera. In the case where a piston reciprocating in a combustion chamber is the target, a mechanism sensing energization to the spark plug in the chamber can generate the flagging signal. Since the time between the flagging signal from generator 28 and the onset of the event is constant, the event to be imaged need not be periodic and need not occur at predictable intervals. All that is necessary is that the event occur at a known time interval after the flagging signal and that the event occurs the same way through numerous repetitions. The flagging signal is represented at 32 in FIG. 2, and is shown occurring a constant time "c" before the onset of the targeted event, which occurs at 34. The targeted event is represented in FIG. 2 as rectangular signal element 39.

Referring again to FIG. 1, there is shown synchronization hardware 30 which receives signals 20 and 32 respectively from camera 16 and signal generator 28. Synchronization hardware 30 generates its own, periodic aperture signal 36 having signal points or nodes 38 located at regular intervals and located on rectangular signal elements 40. Aperture signal 36 is synchronized with video signal 20 so that the beginning of a predetermined time span (time span t, in FIG. 2) occurs at a constant time T after the beginning of a line signal 26. The synchronization hardware has built-in logic to determine whether an an onset 34 of an event occurs within the predetermined time span t. In FIG. 2, the onset 34 of a particular event 39 is shown as occurring within the predetermined time span t. One may view the synchronization hardware as determining whether the time of flagging signal 32 plus time "c" is acceptably close to the occurrence of a node 38. At the same time that synchronization hardware 30 searches for event onsets 34 within predetermined time t, the synchronization hardware is also assigning sequential numbers to line signals 26 from camera 16. Synchronization hardware 30 records in a register and sends to host computer 40 the numbers of any "good" line signals 26 occurring when a match is found between a node 38 and an event 34.

It will be noted that the predetermined time span t referred to above will typically be as small as a few microseconds, although such a time span can be one or two orders of magnitude smaller. It is possible for the predetermined time span to be several nanoseconds, but the imaging process would be rather difficult and tedious.

One of the advantages of my invention is improved temporal resolution. Temporal resolution, as I use that term, is a somewhat subjective measure of imaging quality that includes, inter alia, the ability to distinguish between two events occurring at close but different times. In other words, temporal resolution of a given imaging system involves determining the minimum time separation two events need before the method or system can distinguish them. Another aspect of temporal resolution is the precision with which one can determine at what point in time the imaged event or subcomponent thereof occurred. Still another part of temporal resolution of an imaging method or system is the minimum time duration an event must have before it can be detected.

One important factor in achieving higher levels of temporal resolution is to reduce effective exposure time. I define "effective exposure time as the time an imaging process or system uses to acquire an image or a discrete portion of an image. (For my prototype system the discrete position of the image was a horizontal scan line 62.5 microseconds in duration). In defining effective exposure time, it does not matter whether an imaging system acquires the whole image all at once or whether the imaging system acquires only one discrete portion of the image at a time. The key is how long the acquisition takes for whatever portion of the image is being obtained at one time; that portion can be the entire image or it can be some subdivision of the image such as a pixel, scan line or image field.

Perhaps the best way to illustrate the meaning of effective exposure time is by way of analogy to a still camera. A still camera typically needs a particular minimum amount of time during which its film is exposed to light in order to take a photograph. This minimum amount of time is the still camera's effective exposure time. In comparison, my imaging process captures numerous discrete portions of a composite image, one portion at a time. Any one of these portions takes a certain amount of time to capture; This certain amount of time taken is the effective exposure time of my imaging system and method. For purposes of continued analogy to the still camera, the certain amount of time may be regarded as a period when some sensitive element in my imaging apparatus is exposed to a stimulus such as infra-red light, heat, a magnetic field, or other stimulus.

As has been discussed previously, the portion of the image that I capture at any one time is the scan line, and a scan line takes approximately 62.5 microseconds to complete. Thus the effective exposure time of my system is 62.5 seconds, which is considerably shorter than that for existing cameras. Of course, it must be recalled that my method requires continually imaging portions of repeated occurrences of an event. A set of useful image portions must be gathered until a complete, composite image can be formed from the portions. Therefore the time required to obtain an entire image by my process may possibly take as long as several minutes, and will typically be orders of magnitude longer than the effective exposure time. Again, for clarity, I wish to emphasize that the total acquisition time for an entire image is different from and longer than the effective exposure time in my system.

Figure 5:
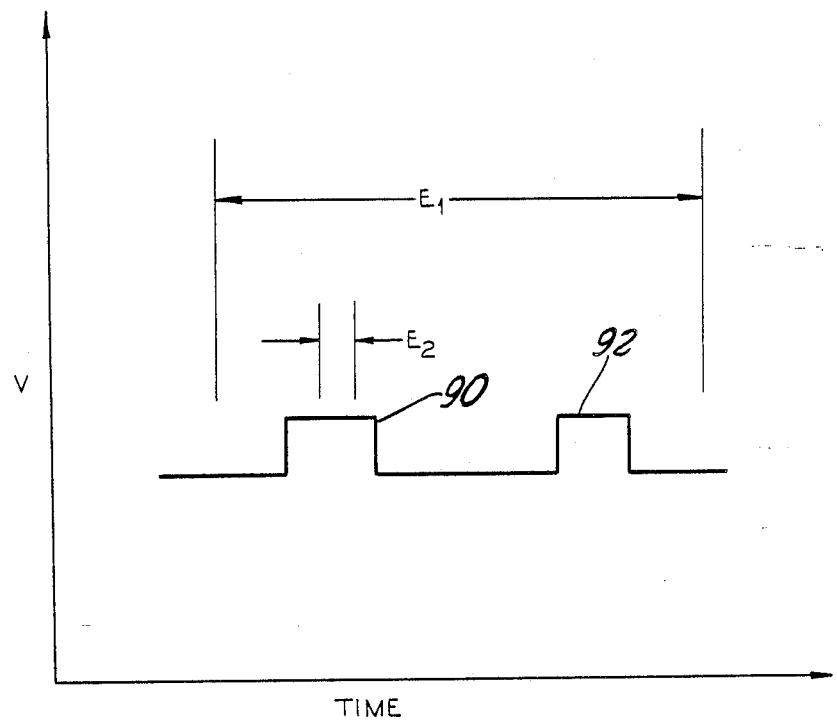
FIG. 5 graphically illustrates exposure time of prior systems and that of the present invention.

The advantage of shorter effective exposure time in improving temporal resolution of an image is illustrated in the graph shown in FIG. 5 where time is along the abscissa and variable V is along the ordinate. V can be any variable such as light intensity or voltage value in a video signal. The graph depicts events 90 and 92 where V temporarily assumes a higher value. The distance $E_1$ represents the effective exposure time of a conventional imaging system and the distance $E_2$ represents the effective exposure time of my system. The effective exposure time for my system is exaggeratedly oversized so that it will be easily seen in the graph. As can be seen from the graph, the two events 90 and 92 would not be distinguishable timewise when the effective exposure time is $E_1$. Also, an image taken when only one of the events occurs gives the viewer of the image a relatively inexact indication of when the event occurred, i.e., sometime during the time span $E_1$. In comparison, the much smaller effective exposure time $E_2$ gives a much more exact indication of when an event (say, event 90) occurred. In addition the effective exposure time of my system would be enable my system to distinguish timewise between events 90 and 92 or between any two events so long as the events are at by a time span at least as great as $E_2$.

As may be apparent from the discussion of FIG. 2, my system images only those repetitions of an event whose onsets occur within the narrow time span t, and t always begins a known time T from the onset of a line signal 26. The narrower t is, the more exactly one knows when an event in a line signal begins or ends. Consequently one obtains better temporal resolution in the image formed by my system as t decreases.

Referring again to FIG. 1, it will be seen that frame grabber 18 receives video signal input from camera 16. Frame grabber 18 is preferably one of the off-the-shelf frame grabbers which is compatible with the RS-170 output from camera 16. While the frame grabber receives the video input, signals from synchronization hardware 30 are sent to host computer 40 carrying information representing the numbers of the good line signals 26. Host computer 40 will send a freeze command to the frame grabber so that the frame grabber saves in memory the completed raster pattern, or frame, when good line signals occur in the frame. The host computer will then instruct the frame grabber to transfer the data representing the good line signals to a buffer within the host computer. When the host computer has received all of this data for a given frame, it will signal the synchronization hardware to clear its memory of information relating to this frame. The synchronization hardware, or the portion thereof temporarily dedicated to the given frame, is then enabled to operate upon signals it receives representing a new frame. The host computer similarly signals the frame grabber so that the frame grabber, or the portion of the frame grabber dedicated to the given frame, will be free for subsequent operations.

Figure 3:
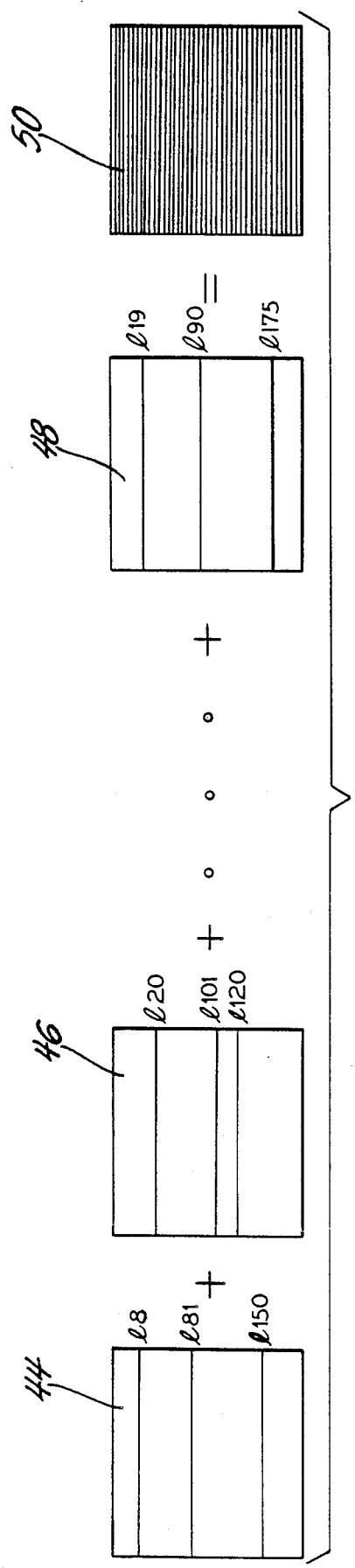
FIG. 3 is a model of the process by which randomly occurring synchronized lines are gathered to create a composite representation of a recurring high speed event.

Host computer 40 sends the accumulated information related to good line signals 26 to a video output 42. As has been previously mentioned, good line signals are not collected in any particular order, but are collected randomly. For purposes of illustration, the line collection process is graphically modeled in FIG. 3, wherein good lines $l_8$, $l_{81}$ and $l_{150}$ are collected from a first frame 44, wherein lines $l_{20}$, $l_{101}$ and $l_{120}$ are collected from a second frame 46 and wherein lines $l_{19}$, $l_{90}$, and $l_{175}$ are collected from nth frame 48. When the good line signals from n frames have been collected, they will form a frameful of lines constituting a complete composite image at 50.

In the process of assembling an image such as 50, it will of course occur that some of the lines will be collected a plurality of times. Additionally it may be preferred to insure that each line is collected some acceptable minimum number of times and the signals for each line then averaged so as to eliminate noise or clutter from the final image. In either event, host computer 40 will count the number of times each line signal is collected, add together the accumulated values for that line signal and then determine an average signal from the accumulated values. The averaged line signals are displayed on video output 42.

Figure 4:
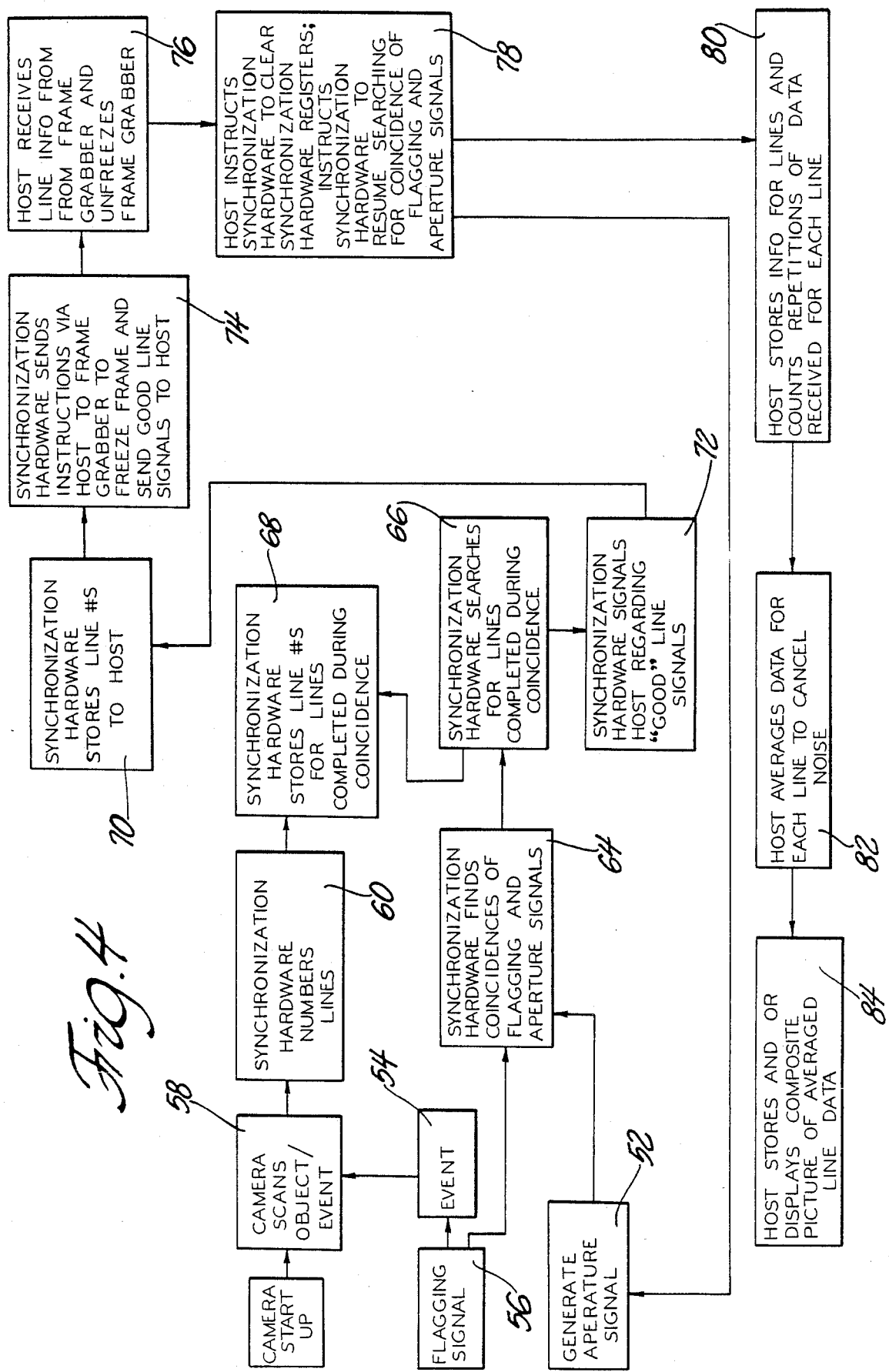
FIG. 4 is a flow chart representing my method for imaging high speed events.

FIG. 4 is a flow chart representing the sequence of steps in my method of imaging high speed recurring events. When the camera 16 is running, synchronization hardware 30 generates the aperture signal 36 as represented at block 52 in FIG. 4. At some known time before the repeating event of interest 54 occurs, a flagging signal 32 is generated as shown at step 56 and the flagging signal is sent to synchronization hardware 30. Camera 16 constantly scans the object plane where event 54 occurs, whereby the camera necessarily scans (step 58) the event as it happens so that at least one line of the camera's raster pattern is completed during the event. As the camera 16 scans, synchronization hardware 30 assigns line numbers to the line signals 26 of the raster pattern of the camera (step 60).

As shown at step 64, synchronization hardware 30 compares the flagging signals 32 to signal nodes 38 of aperture signal 36 to determine whether the onset of any event 54 coincides sufficiently closely with any signal node 38. As shown at step 66, synchronization hardware 30 searches for line signals 26 which occur at the coincidence of an event 54 and a signal node 38. The synchronization hardware then places in its memory the sequential numbers assigned to these line signals (step 68). The synchronization hardware sends a signal to host computer 40 indicating the presence of of good line signals 26 (step 72) and then transfers the sequential numbers of the good line signals to the host computer (step 70). The synchronization hardware also sends instructions via the host computer to frame grabber 18. In response to these instructions, the frame grabber stores the current frame containing the good line signals and transfers data representing the good line signals to the host computer (step 74).

Once the host computer receives the line signal information from the frame grabber, the host "unfreezes" the frame grabber so that the frame grabber can clear its memory of data representing the current frame (step 76). The host computer also now instructs the synchronization hardware to clear its registers of information relating to the current frame. Additionally, host computer instructs the synchronization hardware to resume searching for coincidences between precursor signals 32 and aperture signal nodes 38 (step 78). It will be noted that camera 16 will not have stopped during the above described process and that event 54 and the associated flagging signal will continue to occur. Consequently, when the synchronization hardware resumes generation of aperture signal 36, the entire process of capturing good line signals restarts.

Simultaneously with the restart of the capturing process, the host computer stores the information for each good line signal and counts the number of times it has received information for each line (step 80). The host computer then averages the each line signal step (82) and then stores and/or displays the averaged line signal (step 84). The host computer can be programmed to send an alerting signal when a preselected number of line signals has been captured for every line in the raster pattern of camera 16.

The inventor's system was built around a commercially available infrared imaging camera, because of the inventor's need for infra-red images of high speed phenomena. The raster pattern of the camera was traced by using two sinusoidally driven scanning mirrors, one driven vertically and one driven horizontally. The vertical scanning mirror was driven at a frequency of 60 Hz and the horizontal scanning mirror was driven at a frequency of 4 kHz. The vertical mirror frequency is appropriate for generating a video signal, but the horizontal mirror frequency is one fourth as fast as is required for video.

The camera has two features to remedy the lack of sufficient speed of the horizontal scanning mirror. First, the the camera accepts input from the horizontal scanning mirror during both the horizontal scanning mirror's forward passes and its reverse passes. The camera digitizes the information it receives from the horizontal mirror on the reverse passes, and then reverses the digitized data so that this data is output from the camera in the proper, "forward scan" order. The digitization of information on the reverse passes increases the effective frequency of the horizontal mirror but also decreases the accuracy of this information.

The second feature of the camera to increase the effective frequency of the horizontal scanning mirror is the camera's outputting of each scanned line in duplicate. Thus, if the first horizontal line of the camera's raster pattern output is a forward scanned horizontal line, then the second line of the camera's raster pattern output is a copy of the first line. The third line of the camera's raster pattern output will be a digitized output and the fourth line will be a copy of the digitized third line. The raster pattern output from the camera will be repetitions of the sequence of the four lines just described.

It may be desirable in some cases to utilize only data from the first line, or perhaps from both the first and third lines, of the camera raster pattern. To accomplish this, signals generated by the motion of the horizontal scanning mirror are monitored. The signals are available on an imager bus on at the aforementioned, commercially available infra-red camera, which is the Model 600 IR Imaging Radiometer by Inframetrics of Billerica, Mass.

I prefer to use non duplicate lines, that is either first or third lines discussed above. I also prefer to use only forward scan lines or only reverse scan lines, thereby avoiding a differential in relative velocities between the object being imaged and the scanning mirror. This differential will occur between forward scan lines and reverse scan lines if both types of scan lines are used. In other words, there is one velocity differential between the object or event being imaged and the scanning mirror during forward scanning whereas there is another, unequal velocity differential between the object or event and the scanning mirror during reverse scanning. The inequality between the two velocity differentials causes events in a forward scan line to appear at slightly different locations and at different electromagnetic frequencies than locations and frequencies observed during reverse scans. Therefore the inequality introduces a slight hysteresis into the imaging process.

The synchronization hardware can be reprogrammed to find coincidences between the onset of forward motion of the horizontal scanning mirror the onset of the event to be imaged. The line signal corresponding to the forward motion of the mirror will be considered a good line signal and will be collected as previously described for line signals occurring at the coincidence of a aperture signal node 38 and and the onset of an event 34. The resulting collection of good, "forward scan" line signals will then be used to form a composite image. It may be preferable that, for a given series of frames or completed camera raster patterns, every horizontal line will be a forward scan line in at least one of the frames in the series. In this way it will be possible to build a composite image having a complete set of horizontal lines formed only of non duplicate forward scan lines.

In a fashion similar to the collection of only forward scan lines, the synchronization hardware can be reprogrammed to find coincidences between the onset of the event and the onset either of forward or backward motion of the horizontal scanning mirror, or both motions. The line signals occurring during these coincidences will be treated as good and collectable.

The discussion of the invention has thus far dealt with image acquisition in terms of collecting individual lines until an entire image is acquired. However, it is possible to collect pixels or other pictorial units until an entire image is acquired in the same manner as has been discussed with respect to scan lines, depending on the type of camera or other imaging mechanism that is used.

I wish it to be understood that I do not wish to be limited to the exact details of construction and/or process shown and described herein since obvious modifications will occur to those skilled in the relevant arts without departing from the scope of the following claims.

What is claimed is:

1. A method of imaging a recurring high speed event, comprising:
    generating a flagging signal at a known time interval from each occurrence of the event;
    providing a camera for outputting line signals representing lines of an image field and aiming the camera at the location where the event occurs;
    generating an aperture signal having constant intervals between signal nodes on the aperture signal;
    selecting usable line signals from the line signals from the camera, the selecting comprising the steps of:
        (a) comparing a time at which the flagging signal is generated to a time at which one of the signal nodes occurs and then determining whether the onset of the event occurs within a chosen time span of the one signal node, and
        (b) finding one or more of the usable line signals, the usable line signals being the line signals that are completed within a selected interval after the onset of the event when the event occurs within the chosen time span;
    assigning position indicators to the usable line signals, the indicators identifying the position of the usable line signals within the image field of the camera;
    storing the usable line signals and their associated position indicators; and
    continuing the selecting and storing of usable line signals and assignment of indicators to the usable line signals until usable line signals for every line in the image field have been collected.

2. The method of claim 1 wherein;
    a count of the line signals from the camera is made for each image field generated by the camera; and
    the indicators are numbers resulting from the count.

3. The method of claim 1 wherein the usable line signals are collected in essentially random order to form a completed image, multiple line signals associated with one of the lines of the completed image field being selected before any line signal associated with another of the lines is collected.

4. The method of claim 1 wherein a multiplicity of line signals associated with a given line of the image field are selected and counted, and the multiplicity of line signals is averaged to form a composite line signal associated with the given line.

5. The method of claim 4 wherein a predetermined minimum number of line signals are selected for every line in the image field and the line signals associated with every line in the image field are averaged.

6. The method of claim 4 wherein the averaged line signals are sent to a video output screen, whereby an operator can determine when a sufficient number of averaged line signals has been collected.

7. The method of claim 1 wherein the camera has an oscillating means for producing individual lines of the image field, the number of individual lines produced per unit of time being constant; and wherein the aperture signal is controlled so that the rate of line production of the oscillating means is an integral multiple of the rate at which signal nodes occur in the aperture signal.

8. The method of claim 7 wherein the oscillating means is a horizontal scanning mirror in the camera.

9. A method of imaging a high speed recurring event, comprising:
    (a) providing a camera for outputting line signals representing lines of a camera image field, aiming the camera at the location where the event occurs and operating the camera continuously during repeated occurrences of the event;
    (b) providing synchronization hardware to generate an aperture signal during the repeated occurrences of the event, the aperture signal having signal nodes at equal intervals;

(c) generating a(n) flagging signal at a known time before each occurrence of the event and sending the flagging signal to the synchronization hardware;

(d) using the synchronization hardward to assign line numbers to the line signals generated by the camera, the line numbers indicating the position in the image field of lines with which the line signals are associated;

(e) comparing by the synchronization hardware of the flagging signals with the aperture signal to determine whether the onset of an event occurs within a chosen time span of one of the signal nodes of the aperture signal;

(f) finding a set of the line signals that both represents one of the completed image fields and also contains at least one of the usable line signals, the usable line signals being the line signals of the image field that are completed within a selected interval after the onset of that event which occurs within the chosen time span;

(g) using a frame grabber to temporarily save the set of line signals;

(h) recording in a memory the usable line signals of the set and the line numbers associated with the usable line signals of the set;

(i) clearing the synchronization hardware and the frame grabber of all information relating to the set of line signals and the associated line numbers;

(j) repeating steps (a) through (h) until useable line signals for every line in the image field have been collected.

10. A method of imaging a recurring event, comprising:

generating a flagging signal at a known time interval from each occurrence of the event;

providing a camera for outputting unit signals representing pictorial units of an image field;

generating an aperture signal having constant intervals between signal nodes on the aperture signal;

selecting usable unit signals from the unit signals from the camera, the selecting comprising the steps of:

(a) comparing a time at which the flagging signal is generated to a time at which one of the signal nodes occurs and then determining whether the onset of the event occurs within a chosen time span of the signal node, and (b) finding one or more of the usable unit signals, the usable unit signals being the unit signals that are completed within a selected interval after the onset of the event occurring within the chosen time span;

assigning position indicators to the usable unit signals, the indicators identifying the position of the usable unit signals within the image; and storing the usable unit signals and their associated position indicators; and continuing the selection and storing of usable unit signals and assignment of indicators to the usable unit signals until usable unit signals for every unit in the image field have been collected.

* * * * *